(12) United States Patent
Dauscher (10) Patent No.: US 12,000,432 B2
(45) Date of Patent: Jun. 4, 2024

(54) RADIAL AIR BEARING DEVICE AND METHOD FOR PRODUCING A RADIAL AIR BEARING DEVICE

(71) Applicant: BorgWarner Inc., Auburn Hills, MI (US)

(72) Inventor: Sebastian Dauscher, Immesheim (DE)

(73) Assignee: BorgWarner Inc., Auburn Hills, MI (US)

( * ) Notice: Subject to any disclaimer, the term of this patent is extended or adjusted under 35 U.S.C. 154(b) by 26 days.

(21) Appl. No.: 17/743,575

(22) Filed: May 13, 2022

(65) Prior Publication Data

US 2023/0313831 A1    Oct. 5, 2023

(30) Foreign Application Priority Data

Mar. 31, 2022    (DE) .......................... 102022107695.4

(51) Int. Cl.
*F16C 17/02*    (2006.01)
*F16C 43/02*    (2006.01)

(52) U.S. Cl.
CPC ............ *F16C 17/024* (2013.01); *F16C 43/02* (2013.01)

(58) Field of Classification Search
CPC .................................................... F16C 17/024
See application file for complete search history.

(56) References Cited

U.S. PATENT DOCUMENTS

| 5,658,079 A   * | 8/1997 | Struziak ................ F16C 17/024 |
|                 |        |                              384/106 |
| 8,353,631 B2    | 1/2013 | Kim                                   |
| 8,414,191 B2  * | 4/2013 | Flora ................... F16C 32/0603 |
|                 |        |                              384/106 |
| 8,500,331 B2    | 8/2013 | Kim et al.                            |
| 8,672,549 B2    | 3/2014 | Flora et al.                          |
| 2022/0010834 A1*| 1/2022 | Omori ................... F16C 17/024 |

* cited by examiner

*Primary Examiner* — James Pilkington
(74) *Attorney, Agent, or Firm* — Howard & Howard Attorneys PLLC (57) ABSTRACT

A radial air bearing device includes a bearing plate, a spring steel sheet, and a bearing receptacle. The bearing plate includes one or more bearing plate parts with an inner main side and two wide sides. First and second retaining lugs are provided on each wide side and are bent to the outside. The spring steel sheet includes one or more spring steel sheet parts. The bearing receptacle includes a recess with an inner wall and a first groove and a second groove which extend outwards from the recess. The first groove is arranged axially offset with respect to the second groove. The bearing plate parts and the spring steel sheet parts are arranged along the inner wall so that the spring steel sheet runs between the bearing plate and the inner wall and so that the first and second retaining lugs engage in the first or second groove.

20 Claims, 11 Drawing Sheets

RADIAL AIR BEARING DEVICE AND METHOD FOR PRODUCING A RADIAL AIR BEARING DEVICE

CROSS-REFERENCE TO RELATED APPLICATIONS

This application claims priority pursuant to 35 U.S.C. 119(a) to German Patent Application No. 102022107695.4, filed Mar. 31, 2022, which application is incorporated herein by reference in its entirety.

BACKGROUND

The invention relates to a radial air bearing device and a method for producing a radial air bearing device.

A radial air bearing device is used above all in the case of rotating components with very high rotational speeds, for example, in the case of turbochargers in vehicles.

A radial air bearing device with a radial air bearing comprises an inner bearing plate which is arranged, for example, around a shaft as a rotating component. There is provided on the outside of the bearing plate a spring steel sheet which surrounds the bearing plate and which in the idle state presses the bearing plate onto the outer surface of the shaft.

If the shaft starts to rotate, an air cushion begins to build up between an outer surface of the shaft and an inner surface of the bearing plate so that the bearing plate raises up from the shaft counter to the pressure of the spring steel sheet and thus the rotating shaft is mounted in an almost wear-free manner via the air cushion. The bearing plate and the spring steel sheet can in this case be arranged, for example, in an outer bearing sleeve or, as is often commonplace, for example, in the case of turbochargers, in a bearing housing directly without the provision of an additional bearing sleeve.

Spring steel sheet and bearing plate can be formed in several parts so that they form multiple, for example, three, segment-shaped portions of the bearing and the shaft is encircled by the portions. The fixing of the end regions of the portions is performed in longitudinally extended slots in the bearing sleeve or the bearing housing. Documents U.S. Pat. No. 8,500,331 B2, U.S. Pat. No. 8,672,549 B2 and U.S. Pat. No. 8,353,631 B2 show radial air bearings.

SUMMARY

The object is to indicate an improved radial air bearing device and a method for the production thereof.

The object is achieved by a radial air bearing device and a method for producing a radial air bearing device with the features of the additional independent claims.

The radial air bearing device comprises a bearing plate which comprises one or more bearing plate parts with an inner main side and two wide sides, wherein a first retaining lug and a second retaining lug are provided on each wide side, these being bent to the outside, a spring steel sheet which comprises one or more spring steel sheet parts, and a bearing receptacle with a recess and at least one first groove and at least one second groove which extend outwards from the recess, wherein the at least one first groove is arranged axially offset with respect to the least one second groove. The one or more bearing plate parts and the one or more spring steel sheet parts are arranged along the inner wall of the recess so that the spring steel sheet runs between the bearing plate and the inner wall of the recess and so that the first retaining lugs and the second retaining lugs engage in the at least one first groove or in the at least one second groove.

The bearing plate can be formed in one piece with only one bearing plate part which runs in an annular manner on the inner wall of the recess for the rotating component. Alternatively, the bearing plate is formed in multiple parts, wherein the bearing plate parts form portions of the bearing plate which are arranged in an annular segment shape next to one another on the inner wall of the recess and jointly produce an annular form. The circular segment-shaped bearing plate parts jointly form the bearing plate. The term "annular" comprises both a closed annular form and also an annular form with one of more gaps. The inner bearing plate faces the rotating component. If multiple bearing plate parts are provided, these are arranged next to one another along the inner wall. For example, three bearing plate parts can be provided which extend in each case over approximately 120 degrees along the inner wall. The same as described above for bearing plate parts applies to the arrangement of one-piece or multi-piece spring steel sheets.

The wide sides run in the axial direction. The bearing plate is arranged and curved so that two base sides face one another, either the two wide sides of the same bearing plate part if the bearing plate is in one piece, or two wide sides of two adjacent bearing plate parts. The same applies to the arrangement of one-piece or multi-piece spring steel sheets. The number of bearing plate parts and spring steel sheet parts can be different.

The bearing plate parts and the spring steel sheet parts are clamped into the bearing receptacle and held in their position by the retaining lugs in the grooves. For this, it is sufficient that retaining lugs are only provided at the bearing plate parts. Retaining lugs can advantageously additionally be provided on the spring steel sheet parts. In one embodiment, the grooves are arranged opposite one another on both shell surfaces of the recess so that they are arranged in pairs parallel to an axial direction in the recess which corresponds to the axis of rotation of the rotating component. In the case of multiple first and second grooves, groove pairs with in each case a first and a second groove are advantageously arranged equidistantly along the circumference of the recess.

The bearing receptacle, in which bearing plate and spring steel sheet are arranged, can be formed, for example, as a bearing sleeve or as a housing, for example, a turbocharger housing, with a recess for bearing plate and spring steel sheet.

The radial air bearing device is a device with a radial air bearing. It enables easier handling, in particular in terms of the spring steel sheet and of the bearing plate which form the air bearing and are also referred to as film components. In terms of their small thicknesses, bearing plate and spring steel sheet are sometimes also referred to as bearing film or spring film. The radial air bearing device facilitates their design and involves reduced outlay in production and reduced costs, in particular in the case of the film components. In comparison with a conventional air bearing with a multi-piece bearing plate and spring steel sheet, one embodiment of the radial air bearing device has only one spring steel sheet and one bearing plate which are in each case formed in one piece. The costs of this embodiment amount to approximately a third of those of a conventional three-piece spring steel sheet and bearing plate. The costs for the bearing bush are also reduced by approximately two-thirds.

The radial air bearing device holds and positions a rotatable component, for example, a shaft, and absorbs radial loads. The bearing plate surrounds the rotating component and is fastened with the retaining lugs in a bearing receptacle with at least two grooves for the retaining lugs. The first and second retaining lugs which engage in first or second grooves secure the bearing plate parts of the bearing plate against radial and axial displacement. A first and a second groove are provided for each bearing plate part so that, in the case of only one bearing plate part, the first retaining lugs and the second retaining lugs engage in each case in the same groove. In the case of multiple bearing plate parts, the first and second retaining lugs of adjacent bearing plate parts engage in each case in the same grooves. The retaining lugs in the same groove are not connected to one another and can, but do not have to touch, so that there is a gap between the wide sides of the bearing plate in the latter, more commonplace case.

The inside of the bearing plate faces the rotating component. There is provided on the outside of the bearing plate a spring steel sheet which surrounds the bearing plate and which, in the idle state, presses the bearing plate onto the outer surface of the rotating component by virtue of the fact that the elastic deformation of the spring steel sheet brings about a radial force on the bearing plate. The bearing plate can, for example, be formed to be wavy. In one embodiment, the spring steel sheet parts also have retaining lugs. The spring steel sheet parts have in each case an inner main side and two wide sides, wherein a first retaining lug and a second retaining lug which are bent outwards are provided on each wide side. The first retaining lugs and the second retaining lugs engage in the at least one first groove or in the at least one second groove so that the retaining lugs of bearing plate parts and spring steel sheet parts engage in the same grooves. In the case of this embodiment, the spring steel sheet is not only clamped between the bearing plate and the bearing receptacle, rather is also additionally fixed in the grooves. Since the spring steel sheet part is already fixed by its position between bearing plate and bearing receptacle, it can be sufficient to support the fixing if retaining lugs are provided only on one of the wide sides.

In one embodiment, the first and second retaining lugs are bent outwards via a bending edge substantially longitudinally to an axial direction which corresponds to the axis of rotation. The bending edges advantageously run parallel to the axial direction. The bending edges of adjacent first and second retaining lugs of a bearing plate part or spring steel sheet part run along the same wide side in the same direction. In the case of a one-piece bearing plate or spring steel sheet, its first retaining lugs face one another with their inner main sides and the second retaining lugs face one another with their inner main sides. In the case of a bearing plate or spring steel sheet with multiple bearing plate parts or spring steel sheet parts, the first retaining lugs of adjacent spring steel sheet parts face one another with their inner main sides, and the second retaining lugs of adjacent spring steel sheet parts face one another with their inner main sides.

In one alternative embodiment, the first and second retaining lugs are bent outwards via a bending edge substantially transversely to the axial direction. The bending edges advantageously run at a right angle to the axial direction. The bending edges run transversely to the wide side, i.e. parallel to the face sides. In the case of the bearing plate parts or spring steel sheet parts, its first retaining lugs face one of the face sides with their inner main sides, and the second retaining lugs face the other face side with their inner main sides.

In one embodiment, the first and second retaining lugs are formed from plate portions of the one-piece bearing plate so that the bearing plate can be formed outwardly, for example, from a punched-out plate blank by bending the retaining lugs. In one embodiment, the bearing plate part or the spring steel sheet part has a rectangular basic form with slots which define the plate portions. The slots project from the face sides into the interior so that, in the case of the outwardly bent plate regions, their main sides face the face sides. The bending edges are set back with respect to the face sides so that the bearing plate part or the spring steel sheet part is narrower at the wide-side ends than in the region between the wide sides.

In the case of bending edges which run parallel to the axial direction, in one embodiment, the bearing plate part or the spring steel sheet part has a rectangular basic form and has plate portions which project beyond the wide sides of the basic form for the retaining lugs.

In one embodiment, the bearing plate comprises tongues which are formed by recesses in the bearing plate. The tongues advantageously extend in the circular rotational direction. Additionally or alternatively, the spring steel sheet can also comprise such tongues. The circular rotational direction corresponds to the longitudinal direction in the case of the bearing plate in the flat state. The tongues are pushed outwards by the air cushion of the component rotating in the bearing. The recesses can be formed, for example, by punching or lasering. In the case of multi-piece bearing plates or spring steel sheets, one or more tongues can be provided in the bearing plate parts or spring steel sheet parts. It is also conceivable to combine bearing plate parts and spring steel sheet parts with and without tongues with one another. The position of the tongues in the spring steel sheet can correspond to the position of the tongues in the bearing plate. The recess can be formed to be U-shaped, rectangular or triangular so that correspondingly formed tongues are formed. With an H-shaped recess, two tongues are formed, the tips of which face one another. These tongues run in opposite directions to one another.

The bearing plate part has two opposite face sides which correspond to the longitudinal sides in the case of the bearing plate in the flat state. The tongue is an inner region of the bearing plate around which the recess runs in such a manner that a line between the ends of the recess advantageously runs perpendicularly or almost perpendicularly between the face sides. The recesses advantageously comprise in each case a longitudinal region which extends adjacent, in particular parallel to one of the face sides, and a longitudinal region which extends adjacent to, in particular parallel to the other face side and a transverse region which connects the longitudinal regions. The same applies to the tongues in the spring steel sheet part.

In an idle position, the bearing plate is advantageously prestressed in such a manner that the tongues, in the idle state, project inwards relative to the front sides and are pushed outwards by the air cushion of the rotating component.

In one embodiment, an inner main side of the bearing plate has a coating so that the rotatable component can slide with less friction over the tongues at the start of rotation and the air cushion can build up more easily.

In one embodiment, the spring steel sheet part has two wide sides which have in each case a clip and the bearing plate part comprises two slots in which the clips engage so that spring steel sheet part and bearing plate part can be connected. The slots are arranged adjacent to the wide sides of the bearing plate part. The clips of the spring steel sheet part inserted into the slots can project beyond the bent retaining lugs so that the spring steel sheet part is longer than the bearing plate part with bent retaining lugs. As a result of the connection of spring steel sheet and holding plate by means of clips and slots, the spring steel sheet is held in its position by the bearing plate fastened in the bearing receptacle.

A method for producing a radial air bearing device according to any one of the preceding claims comprises: providing a spring steel sheet blank and imprinting a wave form into the spring steel sheet blank for the formation of a spring steel sheet part, providing a bearing plate blank with plate regions for first and second retaining lugs and bending the plate portions for the formation of a bearing plate part, inserting the spring steel sheet part and the bearing plate part into a recess of a bearing receptacle so that the first retaining lugs of the bearing plate part engage in a first groove or in first grooves and so that the second retaining lugs of the bearing plate part engage in a second groove or in second grooves.

Spring steel sheet and bearing plate have an annular form at the latest with insertion, either because of the annular one-piece bearing plate or one-piece spring steel sheet or because of the multiple ring segment-shaped bearing plate parts or the multiple ring segment-shaped spring steel sheet parts. This shaping can be performed during insertion or before it. The method is less complex than the production of a conventional radial air bearing. During production, an inner main side of the bearing plate blank is advantageously coated in a mold in order to improve the running properties of the rotatable component in the bearing arrangement.

BRIEF DESCRIPTION OF THE DRAWINGS

Several exemplary embodiments are explained in greater detail below on the basis of the drawing. In the drawing.

In the figures, identical components or component with the same function are provided with identical reference numbers.

DETAILED DESCRIPTION

Figure 1:
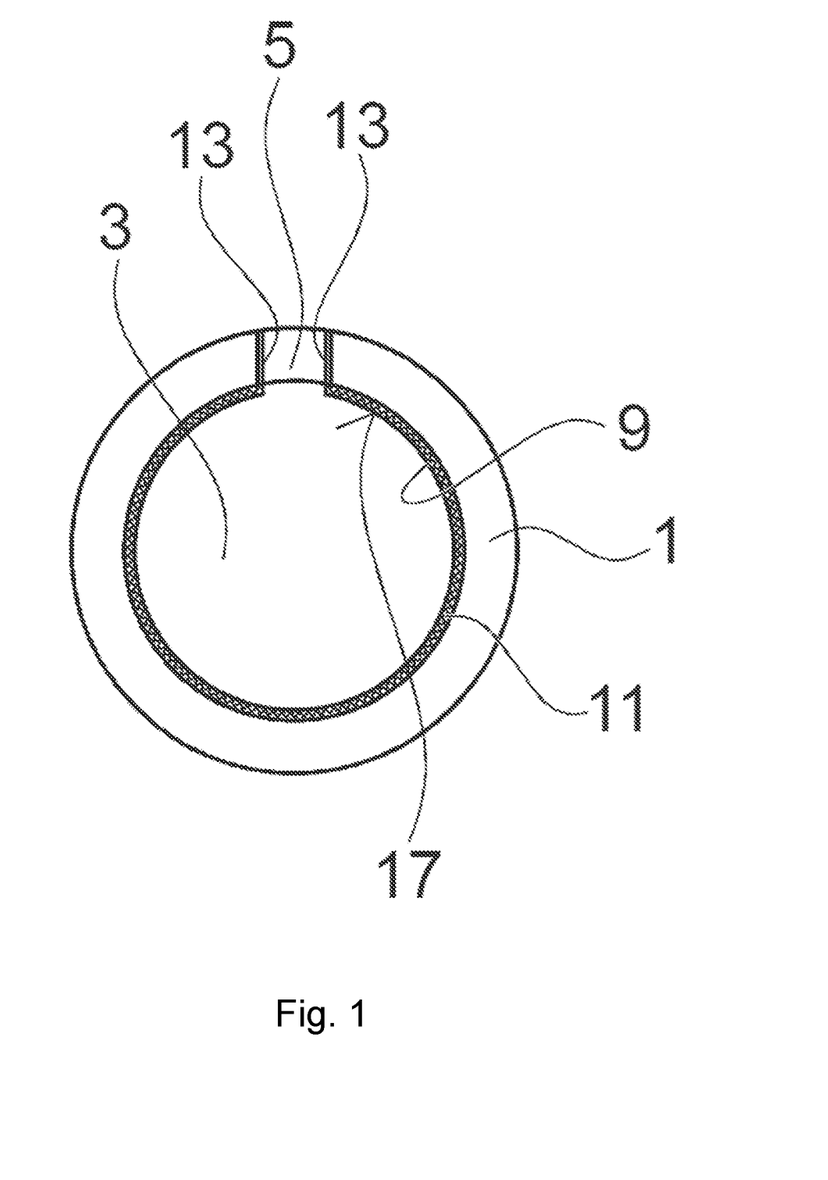
FIG. 1 shows a front view of an exemplary embodiment of a radial air bearing device.

FIG. 1 shows a front view of an exemplary embodiment of a radial air bearing device.

The radial air bearing device has a bearing sleeve 1 as an exemplary embodiment of a bearing receptacle. Bearing sleeve 1 comprises a continuous circular recess 3 from which two grooves extend radially outwards. Of the grooves, only a first groove 5 arranged on the front side is visible in FIG. 1. A rear-side second groove 7 (not represented in FIG. 1) is arranged opposite it.

The radial air bearing device further comprises an inner annular bearing plate 9 and an annular spring steel sheet 11 which surrounds bearing plate 9 and is arranged between bearing sleeve 1 and bearing plate 9. Bearing plate 9 and spring steel sheet 11 are formed in one piece, i.e. bearing plate 9 and spring steel sheet 11 comprise only one bearing plate or only one spring steel sheet part. In this case, bearing plate 9 and spring steel sheet 11 can also synonymously be referred to as bearing plate part or spring steel sheet part. This also applies to further exemplary embodiments with a one-piece bearing plate or one-piece spring steel sheet.

Bearing plate 9 comprises retaining lugs which extend radially outwards, engage in the grooves and hold bearing plate 9 in its position in recess 3 as a result of its spring tension. Only front-side first retaining lugs 13 are visible in FIG. 1. Rear-side second retaining lugs 15 (not represented in FIG. 1) are provided opposite these.

Bearing plate 9 surrounds a rotating component (not represented in FIG. 1), for example, a shaft. If the shaft begins to rotate about a rotational axis, an air cushion starts to build up between the outer surface of the shaft and an inner main side 17 of bearing plate 9 so that bearing plate 9 lifts off from the shaft counter to the pressure of spring steel sheet 11 and the shaft is mounted almost without wear via the air cushion.

The above-mentioned components of the radial air bearing device are represented individually in FIGS. 2A, 2B, 3A, 3B and 4A, 4B.

Figure 2A:
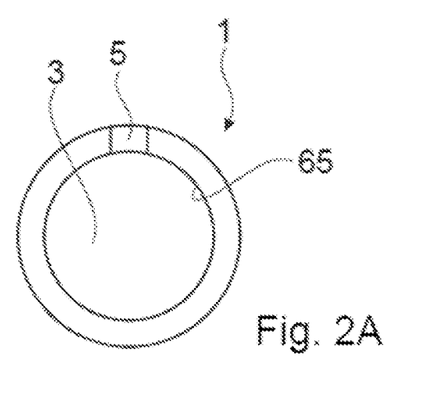
FIG. 2A shows a front view of an exemplary embodiment of a bearing sleeve.
Figure 2B:
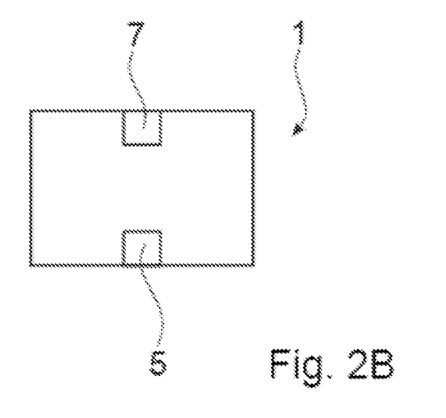
FIG. 2B shows a top view of the exemplary embodiment of the bearing sleeve.

FIG. 2A shows a front view of bearing sleeve 1. FIG. 2B shows a top view of bearing sleeve 1.

Bearing sleeve 1 has a circular ring-cylindrical basic form with a circular-cylindrical recess 3 for the rotating component. Spring steel sheet 11 and bearing plate 9 are arranged in recess 3 so that they run along an inner wall 65 of recess 3. Two grooves extend radially outwards from recess 3, namely a first groove 5 and a second groove 7, which, in this exemplary embodiment, have a rectangular cross-section. First and second groove 5, 7 are arranged opposite one another on a front side and a rear side of bearing sleeve 1 so that they are arranged on a line parallel to an axial direction through bearing sleeve 1. The axial direction corresponds to the axis of rotation of the rotating component. In this exemplary embodiment, grooves 5, 7 are formed as continuous recesses. Alternatively, they can be formed as blind holes.

Instead of in a bearing sleeve 1, recess 3 and grooves 5, 7 can be provided in a housing as an exemplary embodiment of a bearing receptacle, in which housing recess 3 and grooves 5, 7 are arranged in the same manner as described above. Such a recess 3 in a housing can be formed, for example, as a bore hole in a turbocharger housing.

Figure 3A:
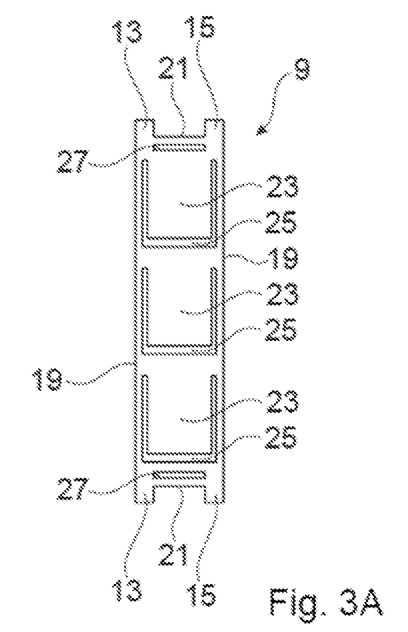
FIG. 3A shows a top view of an exemplary embodiment of a bearing plate in a flat state.
Figure 3B:
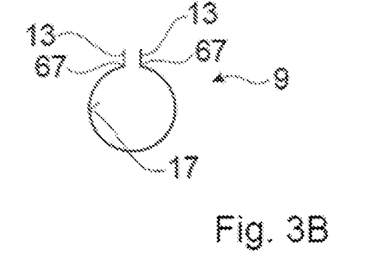
FIG. 3B shows a front view of the exemplary embodiment of the bearing plate.

FIG. 3A shows bearing plate 9, which comprises only one bearing plate part, in a flat state, before retaining lugs 13, 15 have been bent outwards and it is adapted to the round form of recess 3 for fitting in bearing receptacle 1. FIG. 3B shows a front view of circular bearing plate 9.

The bearing plate part as bearing plate 9 has a rectangular, in particular strip-shaped basic form. It has two opposite longitudinal sides 19. Longitudinal sides 19 are the front and rear face sides of circularly curved bearing plate 9. Bearing plate 9 furthermore has two opposite wide sides 21 which run at an angle, in particular transversely to longitudinal sides 19. In the mounted state, an inner main side 17 faces away from spring steel sheet 11, and, in the mounted state, an outer main side faces spring steel sheet 11.

A first retaining lug 13 and a second retaining lug 15 which are formed from plate portions which are bent outwards are provided on each wide side 21. Retaining lugs 13, 15 protrude in the longitudinal direction in the flat state. In this exemplary embodiment, the plate portions are rectangular. First retaining lugs 13 are arranged opposite one another and run adjacent to and flush with one longitudinal side 19. Second retaining lugs 15 are arranged opposite one another and run adjacent to and flush with other longitudinal side 19.

Tongues 23 through recesses 25 in bearing plate 9 are formed in bearing plate 9. Tongues 23 extend in a longitudinal direction which corresponds to a circular rotating direction of curved bearing plate 9. In this exemplary embodiment, three identically formed tongues 21 are provided by way of example.

Recess 25 has two longitudinal regions which extend along and adjacent to longitudinal sides 19, and a transverse region connecting the longitudinal regions. The longitudinal regions run parallel to the longitudinal direction and the transverse region perpendicular thereto so that tongue 23 is formed to be rectangular. Alternatively, the transverse region can run in a curved manner so that tongue 23 is formed, for example, to be U-shaped.

Transversely running slots 27 are provided adjacent to wide sides 21, which slots 27 are formed so that spring steel sheet 11 can engage. Slots 27 do not extend to longitudinal sides 19.

In the mounted state, bearing plate 9 is annular, as represented in FIG. 3B, so that wide sides 21 face one another and a gap is formed between them. Retaining lugs 13, 15 are bent outward, wherein their bending edges 67 are arranged on wide sides 21. Bending edges 67 run at an angle, in particular transversely to the longitudinal direction. First retaining lugs 13 face one another with their inner main sides, in particular running parallel, and second retaining lugs 15 face one another with their inner main sides, in particular running parallel.

Inner main side 17 of bearing plate 9 is coated. In the case of mounted bearing plate 9, the coating protects inner main side 17 and reduces the friction so that it facilitates the starting of the rotatable component.

Figure 4A:
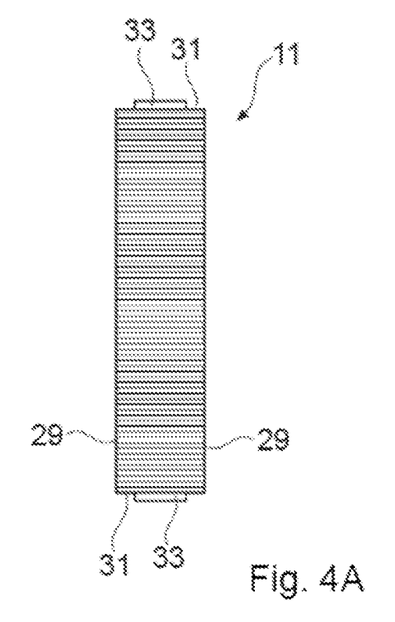
FIG. 4A shows a top view of an exemplary embodiment of a spring steel sheet in a flat state.
Figure 4B:
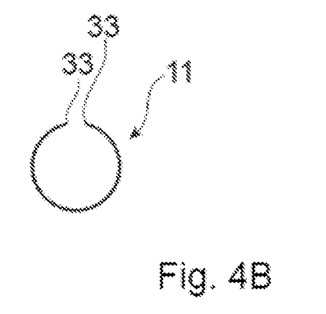
FIG. 4B shows a front view of the exemplary embodiment of the spring steel sheet.

FIG. 4A shows spring steel sheet 11, which comprises only one spring steel sheet part, in a flat state, before it is adapted to the round form of recess 3 for fitting in the bearing receptacle formed as bearing bush 1. FIG. 4B shows a front view of circular spring steel sheet 11.

FIG. 4A shows the spring steel sheet part as spring steel sheet 11 in a flat state, but with a wavy structure. Spring steel sheet 11 has a rectangular, in particular strip-shaped basic form with a wavy structure. It has two opposite longitudinal sides 29 and two opposite wide sides 31. An inner main side faces bearing plate 9, and an outer main side faces the shell surface of recess 3 in the bearing receptacle.

One-piece spring steel sheet 11 is formed to be wavy, wherein wave troughs and wave peaks extend perpendicular to the longitudinal direction. Clips 33 which are formed as planar, rectangular plate regions of spring steel sheet 11 are provided on wide sides 31. In one alternative exemplary embodiment, clips 33 can be trapezoidal. Clips 33 can be introduced into slots 27 of bearing plate 9.

In the mounted state, spring steel sheet 11 is annular so that wide sides 31 face one another and there is a gap between them. Alternatively, clips 33 strike one another or overlap.

The dimensions of spring steel sheet 11 and bearing plate 9 are selected so that bearing plate 9 is advantageously just as wide as spring steel sheet 11. However, spring steel sheet 11 is advantageously wider than tongues 23. The lateral edge regions of bearing plate 9 next to tongues 23 can, during assembly of spring steel sheet 9 and bearing plate 11 and subsequent insertion into bearing bush 1, arch up so that they fix spring steel sheet 11 in recess 3. The length of spring steel sheet 11 is such that the wavy region extends between slots 27 and clips 27 engage in slots 23, wherein clips 27 can protrude beyond wide sides 19 of bearing plate 9 at least in a flat state.

Figure 5A:
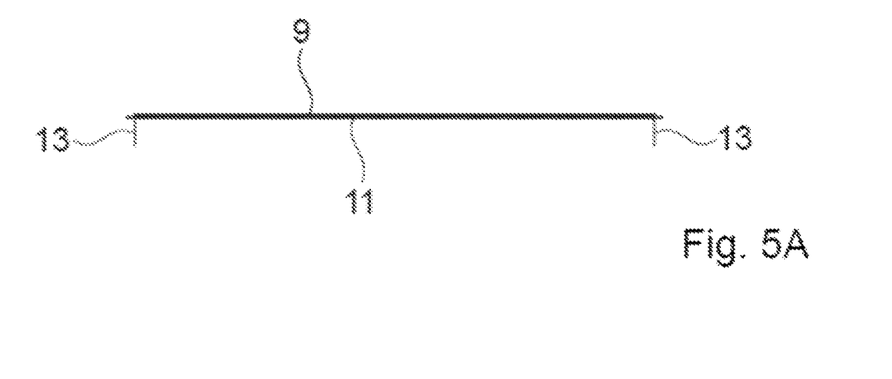
FIG. 5A shows a front view of an exemplary embodiment with assembled spring steel sheet and bearing plate in a straight state.
Figure 5B:
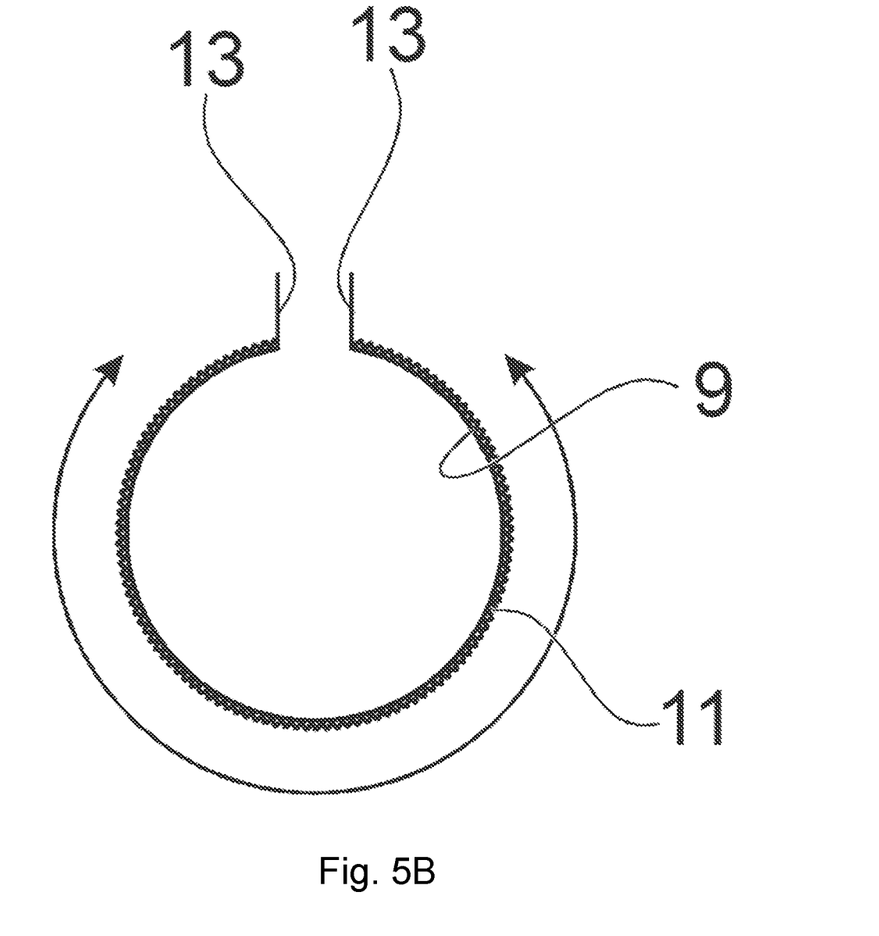
FIG. 5B shows a front view of the exemplary embodiment with assembled circular spring steel sheet and bearing plate.

FIGS. 5A and 5B illustrate the mounting of bearing plate 9 and spring steel sheet 11 to be described on the basis of front views. FIG. 5A shows straight spring steel sheet 11 and straight bearing plate 9 which have been assembled by virtue of the fact that clips 33 of spring steel sheet 11 have been pushed into slots 27 of bearing plate 9. Retaining lugs 13, 15 are bent outwards at a right angle.

FIG. 5B shows spring steel sheet 11 and bearing plate 9 deformed in a circular manner so that wide sides 21, 31 face one another and first retaining lugs 13 face one another with their inner main sides and the two retaining lugs 15 face one another with their inner main sides.

Circular spring steel sheet 11 and circular bearing plate 9, which have been assembled, are jointly inserted into recess 3 of the bearing receptacle so that first retaining lugs 13 engage in first groove 5 and second retaining lugs 15 engage in second groove 7 and as a result spring steel sheet 11 and bearing plate 9 are retained in their form and position, as represented in FIG. 1. The circular shaping of spring steel sheet 11 and bearing plate 9 can be performed during insertion or immediately before it or by a separating shaping step so that spring steel sheet 11 and bearing plate 9 already have a rounded, in particular circular form prior to insertion into recess 3.

As a result of the tensioning of circular bearing plate 9, tangential forces which act oppositely and retain retaining lugs 13, 15 positively in grooves 3, 7 act on retaining lugs 13, 15 of opposite wide sides 21. Retaining lugs 13, 15 advantageously bear flat against the walls of grooves 5, 7. An additional fixing of retaining lugs 13, 15 can be provided.

In an idle position, circular bearing plate 9 is prestressed such that that tongues 23 advantageously protrude inwards in regions relative to longitudinal sides 19. The edge regions of bearing plate 9 to the side of tongues 23 hold spring steel sheet 11 in its position.

Figure 6:
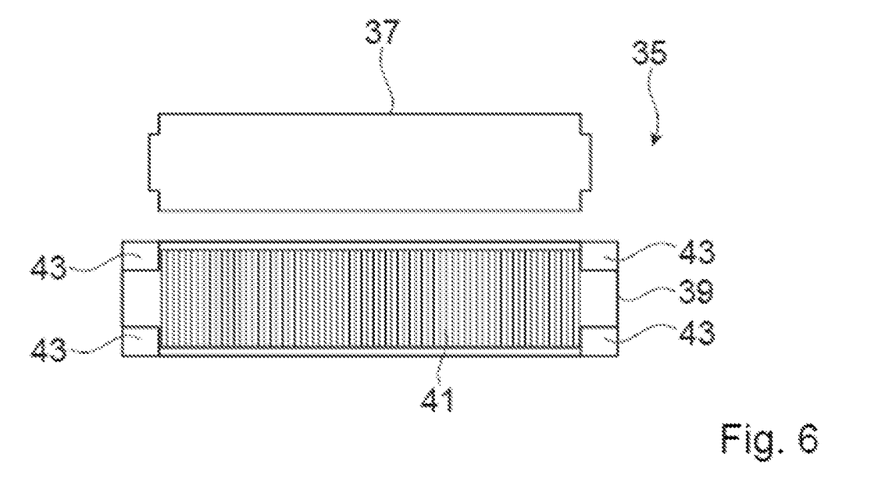
FIG. 6 schematically shows an exemplary embodiment of a stamp press.

FIG. 6 shows, in the top view, an upper part 37 and a lower part 39 of a stamp press 35 which is used in the production of an exemplary embodiment of a spring steel sheet part. Lower part 39 comprises a wavy stamp region 41 beyond which positioning devices 43 project at the corners. Upper part 37 has, on the lower side, a wavy stamp region and is formed so that upper part 37 can be lowered between positioning devices 43 and the wavy stamp regions of upper part 37 and lower part 39 imprint a wave form on a plate blank arranged therebetween.

Figure 7:
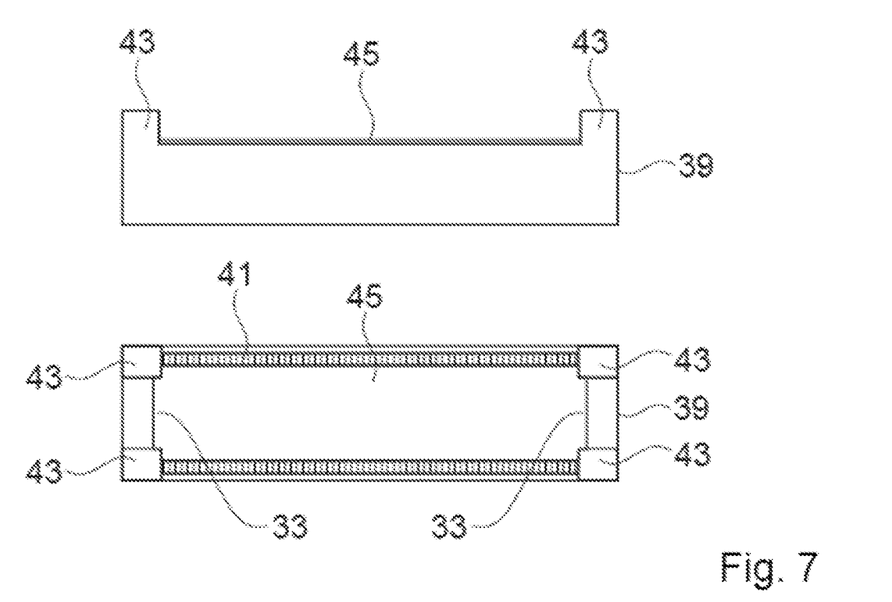
FIG. 7 shows a lower part of the exemplary embodiment of the stamp press with a spring steel sheet blank.

FIG. 7 shows lower part 39 of stamp press 35 in the top view (bottom) and side view (top) into which a spring steel sheet blank 45 is placed. Spring steel sheet blank 45 has a rectangular basic form with clips 33 on the wide sides. Such a spring steel sheet blank 45 can be punched out, for example, from a plate. Spring steel sheet blank 45 is thus placed into lower part 39 so that its clips 33 are arranged between positioning devices 43. As a result of this, spring steel sheet blank 45 is oriented so that its longitudinal sides run transversely with respect to the wave peaks and troughs of stamp regions 41. By pressing together upper part 37 and lower part 39, spring steel sheet blank 45 is deformed in a wave-shaped manner. Clips 33 remain straight.

Figure 8:
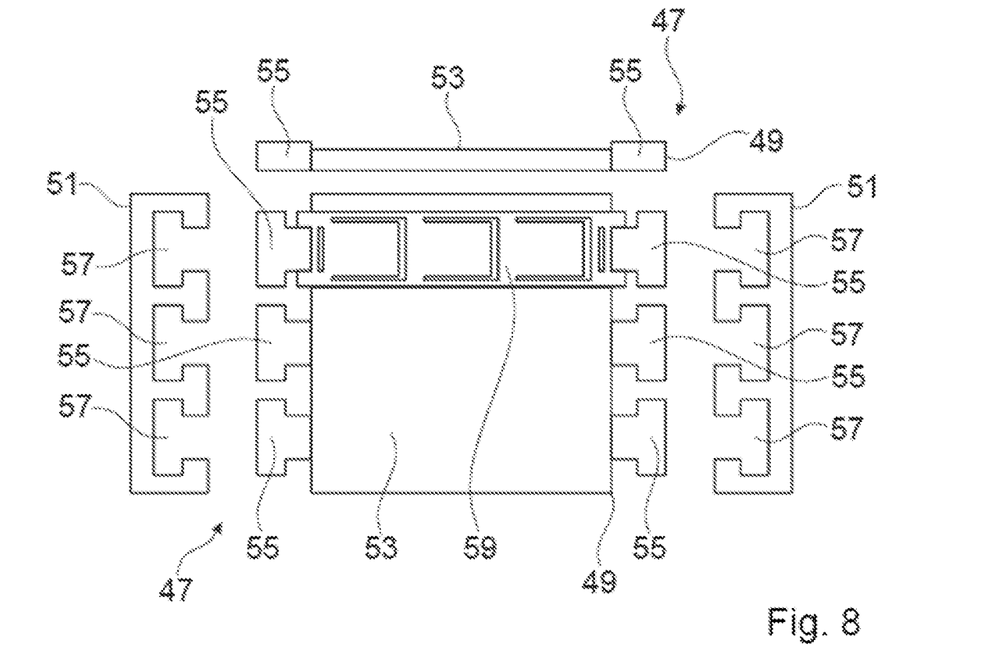
FIG. 8 schematically shows an exemplary embodiment of a mold with a bearing plate blank.

FIG. 8 shows a multi-piece mold 47 for producing an exemplary embodiment of a bearing plate part. Retaining lugs 13, 15 can be bent around with mold 47 and subsequently inner main side 17 of the bearing plate part in mold 47 can be coated.

Mold 47 comprises a lower part 49, which is represented in the top view and in the side view (at the top), and two side parts 51, which are represented in the top view.

Lower part 49 comprises a support 53 for multiple bearing plate parts and positioning devices 55 which protrude laterally of support 49 and are arranged in pairs on opposite sides. Side parts 51 serve to bend retaining lugs 13, 15 and comprise sipes 57 in which positioning devices 55 engage if side parts 51 are lowered to the side of support 53 and thereby bend via plate regions protruding beyond support 53 which form retaining lugs 13, 15. In this exemplary embodiment, in each case three positioning devices 55 for three bearing plate blanks 59 are provided, by way of example, on the sides.

One-piece bearing plate blank 59 has a rectangular basic form with regions protruding on the wide sides for retaining lugs 13, 15. Its form corresponds to the form of the bearing plate part in a flat state, as represented by way of example in FIG. 3A. Such a bearing plate blank 59 can, for example, be punched out from a plate. Bearing plate blank 59 is placed onto support 53 so that opposite positioning devices 55 grip between the plate regions for retaining lugs 13, 15 on the wide sides and the plate regions for retaining lugs 13, 15 project beyond support 53.

During lowering of side parts 51, the plate regions projecting beyond support 53 are bent and thus retaining lugs 13, 15 which project outwards in the case of the bearing plate part which is bent later are formed.

Figure 9:
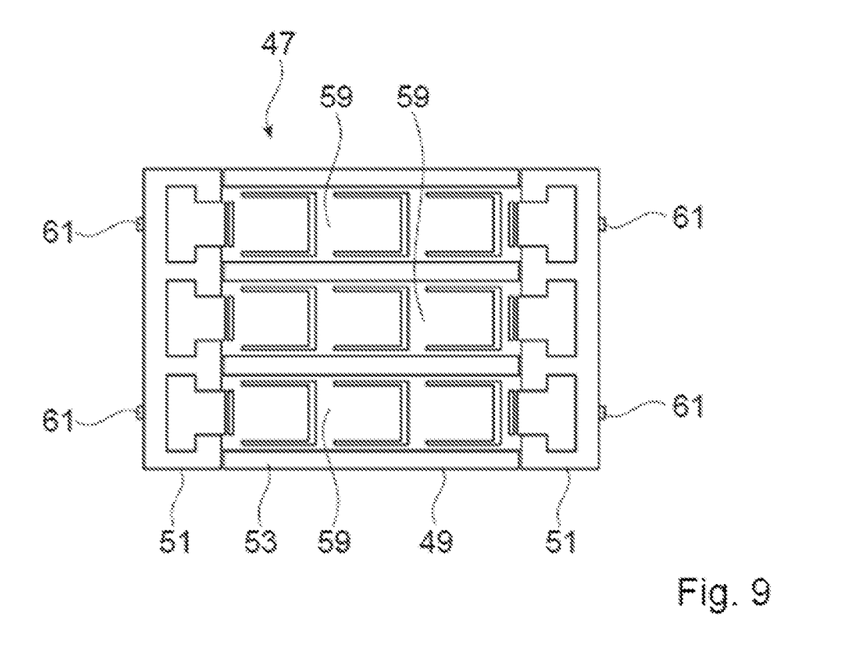
FIG. 9 shows the exemplary embodiment of the assembled mold with bearing plate blanks.

FIG. 9 shows mold 47 with three bearing plate blanks 59 after placing on of side parts 51 so that retaining lugs 13, 15 are already bent. Side parts 51 are connected by screws 61 to lower part 49 so that bearing plate blanks 59 are fixed by retaining lugs 13, 15 clamped between lower part 49 and side part 51 in mold 47. In this mold, inner main sides 17 of bearing plate blanks 59 are coated so that retaining lugs 13, 15 are free from the coating.

The assembly and insertion of the bearing plate part and the spring steel sheet part are subsequently carried out, as has already been described in conjunction with FIGS. 5A and 5B for a one-piece bearing plate 9 and spring steel sheet 11.

Further exemplary embodiments of bearing sleeve 1 and bearing plate part as bearing plate 9 and spring steel sheet part as spring steel sheet 11 are described below.

Figure 10:
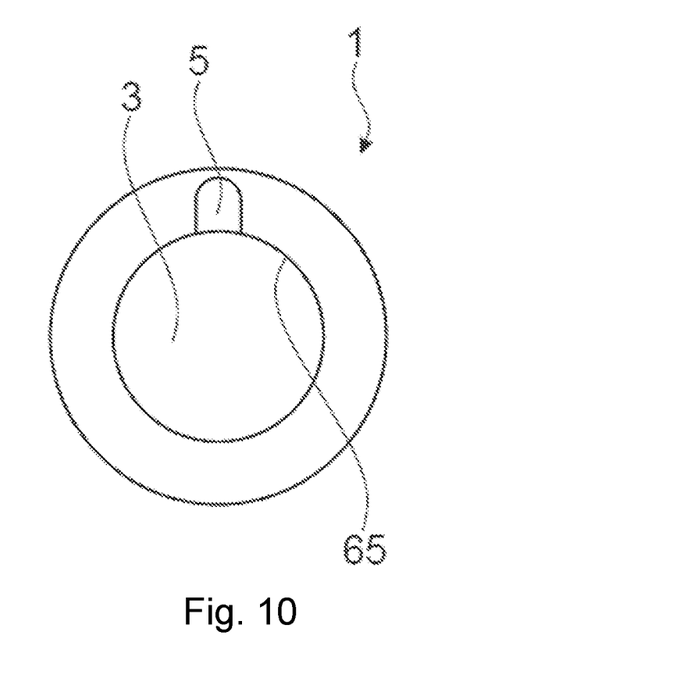
FIG. 10 shows a front view of a further exemplary embodiment of a bearing sleeve.

FIG. 10 shows a front view of a further bearing sleeve 1 as an exemplary embodiment of a bearing receptacle. Bearing sleeve 1 has a circular ring-cylindrical basic form with a circular cylindrical recess 3 for the rotating component. Spring steel sheet 11 and bearing plate 9 can be arranged in recess 3, which has an inner wall 65. Two grooves, namely a first groove 5 and a second groove 7, which in this exemplary embodiment have an arc-shaped cross-section, extend radially outwards from recess 3. First and second groove 5, 7 are arranged opposite one another on a front side and a rear side of bearing sleeve 1 so that they are arranged on a line parallel to a longitudinal axis through bearing sleeve 1. The longitudinal axis corresponds to the axis of rotation of the rotating component. In this exemplary embodiment, grooves 5, 7 are formed as blind holes with an arc-shaped cross-section, as can be formed, for example, by milling.

Instead of in a bearing sleeve 1, recess 3 and grooves 5, 7 can be provided in a housing as an exemplary embodiment of a bearing receptacle, in which housing recess 3 and grooves 5, 7 are arranged in the same manner as described above. Such a recess 3 in a housing can be formed, for example, as a bore hole in a turbocharger housing.

Figure 11A:
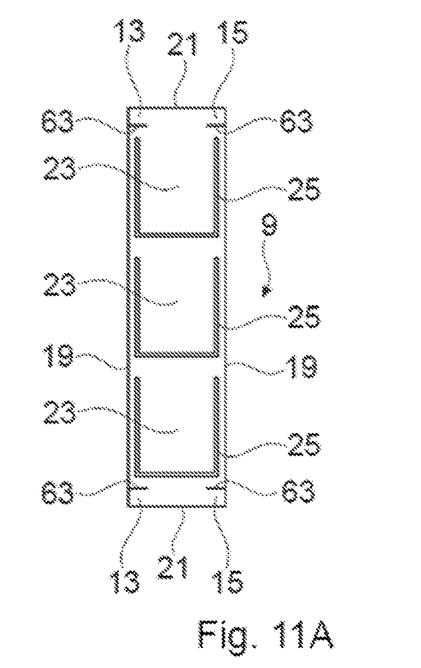
FIG. 11A shows a top view of a further exemplary embodiment of a bearing plate in a flat state.
Figure 11B:
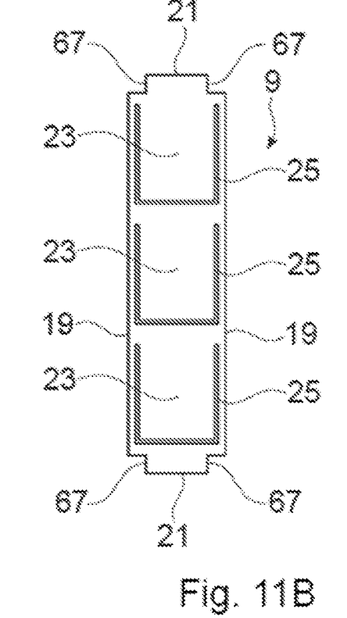
FIG. 11B shows a top view of the further exemplary embodiment of the bearing plate.
Figure 11C:
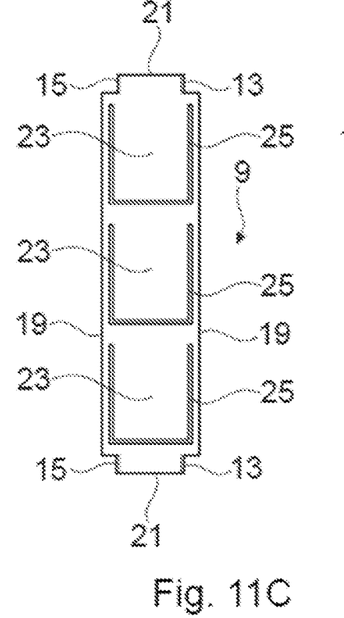
FIG. 11C shows a bottom view of the further exemplary embodiment of the bearing plate.
Figure 11D:
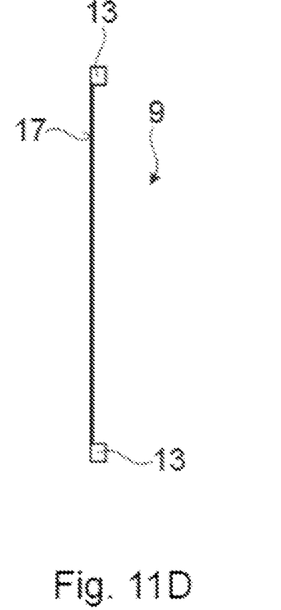
FIG. 11D shows a side view of the further exemplary embodiment of the bearing plate.

FIG. 11A shows a further exemplary embodiment of a bearing plate 9, which comprises only one bearing plate part, in a flat state, before retaining lugs 13, 15 have been bent outwards. FIGS. 11B, 11C and 11D show the bearing plate part as bearing plate 9 in a top view, a bottom view and a side view. It is flat before it is curved for fitting into the bearing receptacle. The description concentrates on differences from the exemplary embodiments described above.

The bearing plate part as bearing plate 9 has a rectangular, in particular strip-shaped basic form. It has two opposite longitudinal sides 19. Longitudinal sides 19 are the front and rear face sides of bent bearing plate 9 which has been inserted into the bearing receptacle. Bearing plate 9 furthermore has two opposite wide sides 21 which run transversely to longitudinal sides 19. In the mounted state, an inner main side 17 faces away from spring steel sheet 11, and, in the mounted state, an outer main side faces spring steel sheet 11.

A first retaining lug 13 and a second retaining lug 15 which are formed from plate regions which, in the flat state, are the corner regions of the rectangular basic form are provided on each wide side 21. Slots 63 which run from longitudinal sides 19 into the plate interior parallel to wide sides 21 define these regions and enable bending thereof to the outside. As a result of this, bending edges 67 run parallel to longitudinal sides 19, but are offset inwardly from these, so that the main sides of first retaining lugs 13 are oriented parallel to one of longitudinal sides 19 and the main sides of second retaining lugs 15 are oriented parallel to other longitudinal side 19.

Tongues 23 through recesses 25 in bearing plate 9 are formed in bearing plate 9. Tongues 23 extend in a longitudinal direction which corresponds to a circular rotating direction of rounded bearing plate 9. In this exemplary embodiment, three identical, rectangular tongues 21 are provided by way of example.

Inner main side 17 of bearing plate 9 is coated. In the case of mounted bearing plate 9, the optional coating protects inner main side 17 and reduces the friction so that it facilitates starting of the rotatable component.

In the mounted state, bearing plate 9 is annular so that first retaining lugs 13 engage in first groove 5 of a bearing receptacle and second retaining lugs engage in second groove 7 of a bearing receptacle. As a result of this, the edge regions overlap on wide sides 21. Retaining lugs 13, 15 oriented parallel to longitudinal sides 19 enable easier placing of bearing plate 1 into recess 3 and grooves 3, 5. It is also less sensitive to shear forces.

Slots 27, into which a spring steel sheet 11 can be introduced, are not provided in this exemplary embodiment. In the case of an alternative exemplary embodiment, they can, however, be provided with such retaining lugs 13, 15.

Figure 12A:
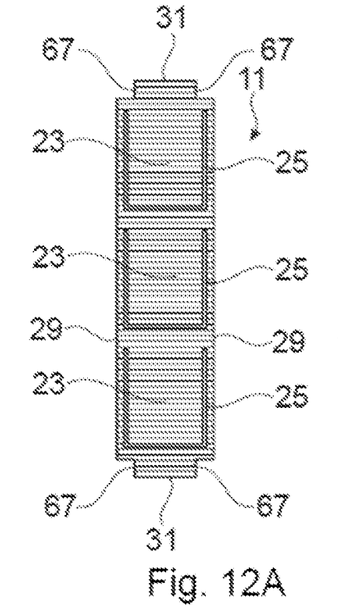
FIG. 12A shows a top view of a further exemplary embodiment of a spring steel sheet.
Figure 12B:
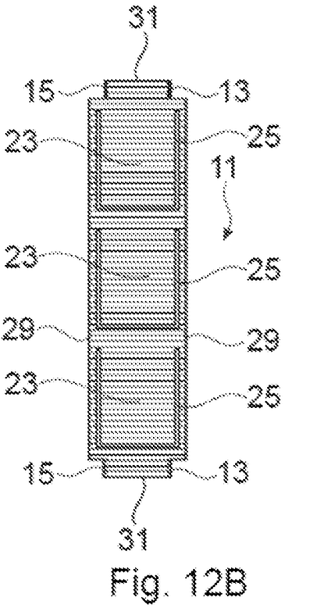
FIG. 12B shows a bottom view of the further exemplary embodiment of the spring steel sheet.
Figure 12C:
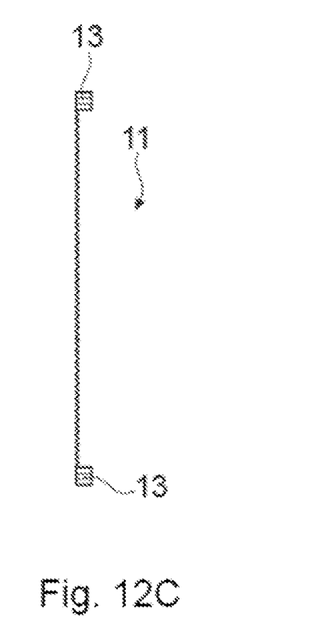
FIG. 12C shows a side view of the further exemplary embodiment of the spring steel sheet.

FIGS. 12A, 12B and 12C show a further exemplary embodiment of a spring steel sheet part as spring steel sheet 11 in a top view, a bottom view and a side view. In order to avoid repetition, the description concentrates on differences from the hitherto described exemplary embodiments.

Spring steel sheet 11, which only comprises one spring plate part, has the same form as bearing plate 9 described in conjunction with FIGS. 11A, 11B, 11C and 11D. Spring steel sheet 11 is, however, wavy. It has first and second retaining lugs 13, 15 which are formed by outwardly bent plate regions. The plate regions can be flat or wavy. Bending edges 67 run parallel to longitudinal sides 29, but are offset inwardly with respect to them, so that retaining lugs 13, 15 are oriented parallel, but offset with respect to longitudinal sides 29.

Spring steel sheet 11 is formed to be wavy, wherein the peaks and troughs of the waves run parallel to wide sides 31.

Spring steel sheet 11 furthermore has tongues 23 formed by rectangular recesses 25. They prevent excess deformation of the wave form in the case of heat-induced material expansion which could negatively influence the spring action.

Bearing plate 9 and spring steel sheet 11, which have been described in FIGS. 11A, 11B, 11C and 11D or 12A, 12B and 12C, can be inserted together in a bearing receptacle, as is described, for example, in FIGS. 2A and 2B or FIG. 10. First and second retaining lugs 13, 15 of bearing plate 9 and spring steel sheet 11 engage in the same first groove 5 or the same second groove 7. The width of grooves 5, 7 corresponds to the width of retaining lugs 13, 15. The positions of tongues 23 of bearing plate 9 and spring steel sheet 11 correspond. They advantageously have the same width. The length and width of bearing plate 9 can differ slightly from the length and width of spring steel sheet 11 in order to optimize the fit in the bearing receptacle.

Figure 13A:
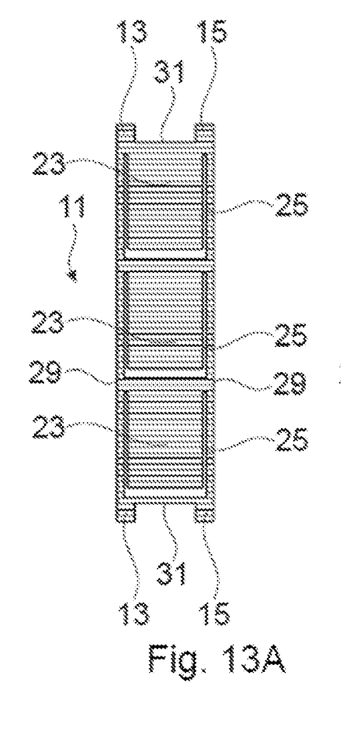
FIG. 13A shows a top view of a further exemplary embodiment of a spring steel sheet in a flat state.
Figure 13B:
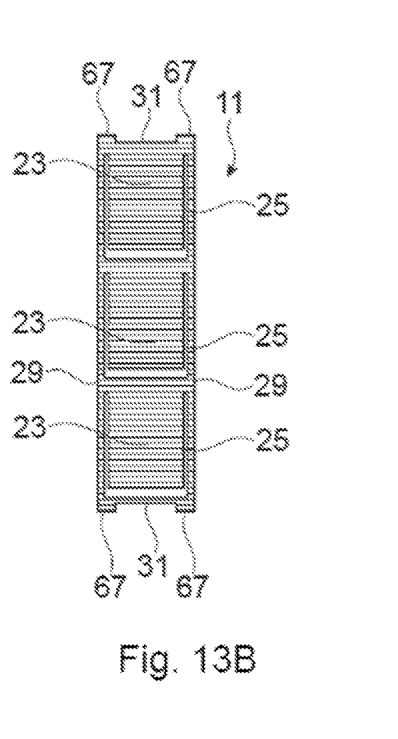
FIG. 13B shows a top view of the further exemplary embodiment of the spring steel sheet.

FIG. 13A shows a further exemplary embodiment of a spring steel sheet 11, which comprises only one spring steel sheet part, in a flat state. FIG. 13B shows spring steel sheet 11 in a plan view.

Spring steel sheet 11 has the same form as bearing plate 9 described in conjunction with FIGS. 3A and 3B. Spring steel sheet 11 also has tongues 23. However, no slots 27 are provided on wide sides 31. Bending edges 67 of first and second retaining lugs 13, 15 run parallel to wide sides 31. Such a spring steel sheet 11 can be inserted with bearing plate 9 described in FIGS. 3A and 3B, which, however, does not have to have any slots 27, in a bearing receptacle, as is described, for example, in FIGS. 2A and 2B or FIG. 10. First and second retaining lugs 13, 15 of bearing plate 9 and spring steel sheet 11 engage in the same first or second groove 5, 7. The length and width of bearing plate 9 can differ slightly from the length and width of spring steel sheet 11 in order to optimize the fit in the bearing receptacle.

In a further exemplary embodiment, bearing plate parts and spring steel sheet parts, bending edges 67 of which run parallel to one another, are inserted in a bearing receptacle. Thus, for example, spring steel sheet 11 from FIGS. 13A and 13B and bearing plate 9 from FIGS. 11A, 11B, 11C and 11D can be inserted in the same bearing bush 1. First retaining lugs 13 of bearing plate 9 and spring steel sheet are in the same first groove 5, and second retaining lugs 12 of bearing plate 9 and spring steel sheet are in the same second groove 7.

Figure 14:
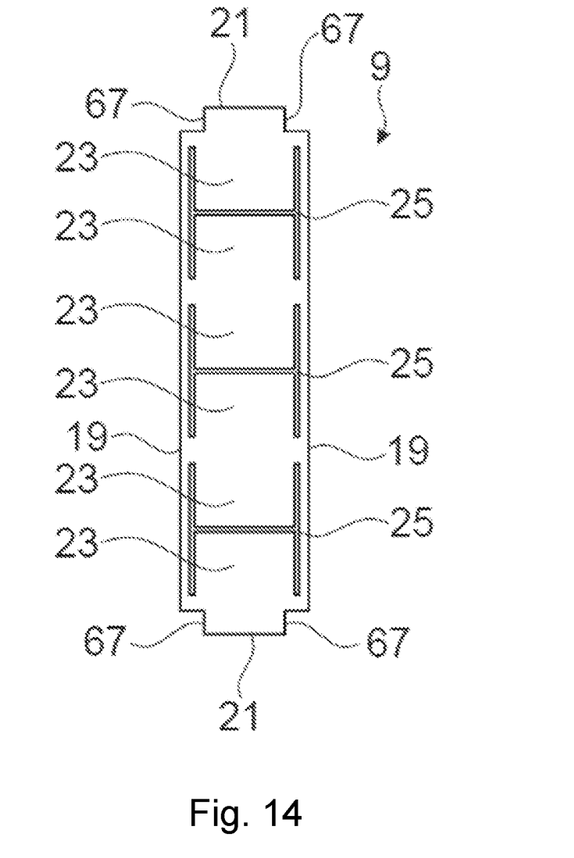
FIG. 14 shows a top view of the further exemplary embodiment of a bearing plate.

FIG. 14 shows a further exemplary embodiment of a bearing plate part as a one-piece bearing plate 9 in a top view. It differs from the exemplary embodiment which has been described in conjunction with FIGS. 11A, 11B, 11C and 11D in the form of tongues 23.

In this exemplary embodiment, tongues 23 are formed by H-shaped recesses 25, wherein a transverse slot runs between two longitudinal slots so that tongues 23 are formed on both sides of the transverse slot, the tongue tips of which tongues 23 face one another. Such a tongue form can also be provided in the case of a spring steel sheet 11.

Figure 15:
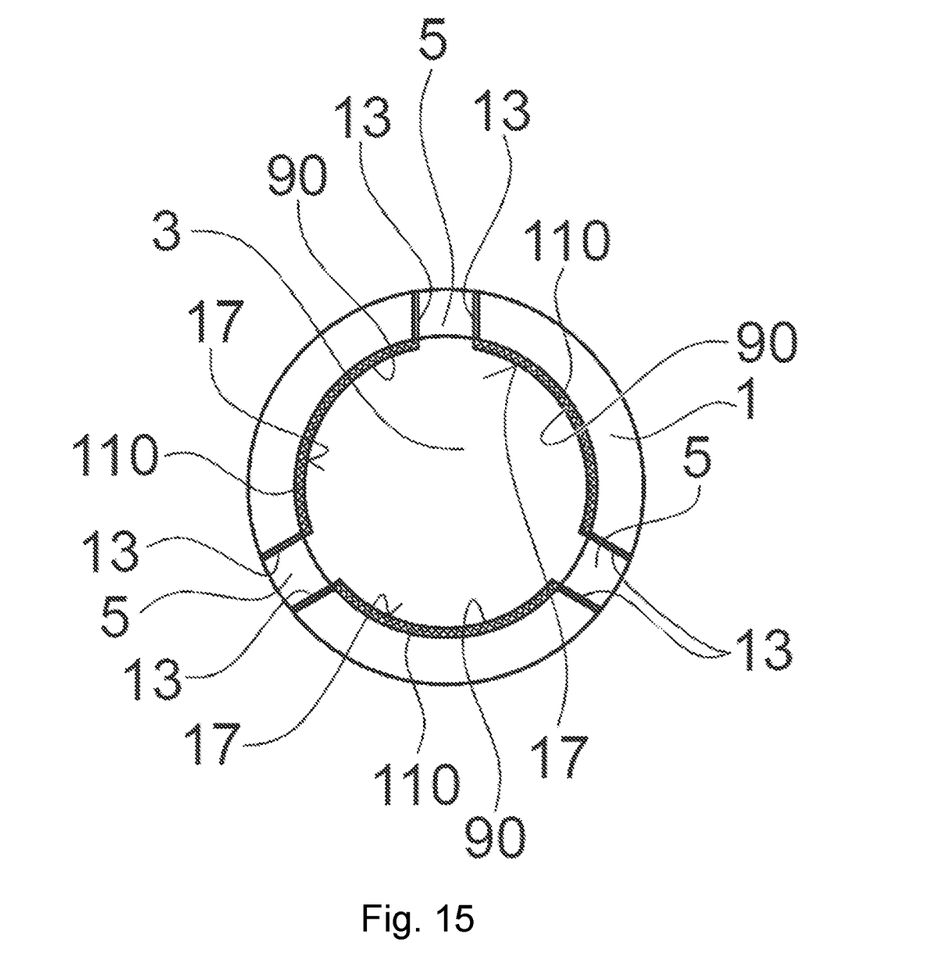
FIG. 15 shows a front view of a further exemplary embodiment of a radial air bearing device.

FIG. 15 shows a front view of a further exemplary embodiment of a radial air bearing device. It differs from the exemplary embodiment described in FIG. 1 in that bearing plate 9 and spring steel sheet 11 comprise multiple bearing plate parts 90 or multiple spring steel sheet parts 110. In this exemplary embodiment, three bearing plate parts 90 and three spring steel sheet parts 110 are provided.

The radial air bearing device has a bearing sleeve 1 as an exemplary embodiment of a bearing receptacle. Bearing sleeve 1 has a circular recess 3, from which six grooves extend radially outwards. Of the grooves, only three first grooves 5 arranged at the front side are visible in FIG. 1. Three rear-side second grooves 7 (not represented in FIG. 15) are arranged opposite these.

The radial air bearing device further comprises an inner annular bearing plate 9 with three bearing plate parts 90 and an annular spring steel sheet 11 which surrounds bearing plate 9 with three spring steel sheet parts 110. Spring steel sheet 11 is arranged between bearing sleeve 1 and bearing plate 9. Bearing plate parts 90 are arranged as ring segments running along inner wall 65 of recess 3 and thus form multi-piece annular bearing plate 9. Spring steel sheet parts 110 are arranged as ring segments running along the inner wall of recess 3 between bearing plate parts 90 and inner wall 65 and thus form multi-part annular spring steel sheet 11.

Bearing plate parts 90 comprise retaining lugs 13, 15 which extend radially outwards, engage in grooves 5, 7 and hold bearing plate parts 90 in their position in recess 3 as a result of their spring tensioning. Only front-side first retaining lugs 13 are visible in FIG. 15. Rear-side second retaining lugs 15 (not represented in FIG. 15) are provided opposite these.

A first and a second groove 5, 7 are provided for each bearing plate part 90. In the case of multiple bearing plate parts 90, first and second retaining lugs 13, 15 of adjacent bearing plate parts 90 engage in each case in the same first or second grooves 5, 7. In the case of exemplary embodiments where spring steel sheet parts 110 also have retaining lugs 13, 15, this also applies to their retaining lugs 13, 15.

Bearing plate parts 90 and spring steel sheet parts 110 of multi-piece bearing plates 9 or spring steel sheets 11 can be formed like the embodiments already described above of one-piece bearing plates 9 or one-piece spring steel sheets 11 and be combined with one another in various ways. Their length is, however, shorter since they only extend along a segment region of recess 3.

The features indicated above and in the claims as well as the features which can be inferred from the illustrations can advantageously be realized both individually or also in various combinations. The invention is not restricted to the described exemplary embodiments, but rather can be modified in a number of ways within the expertise of the person skilled in the art.

REFERENCE NUMBERS

1 Bearing sleeve
3 Recess
5 First groove
7 Second groove
9 Bearing plate
11 Spring steel sheet
13 First retaining lug
15 Second retaining lug
17 Inner main side
19, 29 Longitudinal side
21, 31 Wide side
23 Tongue
25 Recess
27 Slot
33 Clip
35 Stamp press
37 Upper part
39, 49 Lower part
41 Stamp region
43, 55 Positioning device
45 Spring steel sheet blank
47 Mold
51 Side part
53 Support
57 Sipe
59 Bearing plate blank
61 Screw
63 Slot
65 Inner wall
67 Bending edge
90 Bearing plate part
110 Spring steel sheet part

What is claimed is:

1. A radial air bearing device comprising:
a bearing receptacle comprising a recess with an inner wall and at least one first groove and at least one second groove which extend outwards from the recess, wherein the at least one first groove is arranged axially offset with respect to the least one second groove,
an annular bearing plate arranged along the inner wall which comprises one or more bearing plate parts, with each bearing plate part comprising a radially inward side and two circumferential ends, wherein a first retaining lug is provided on one of the circumferential ends and wherein a second retaining lug is provided on the other one of the circumferential ends, with each of the first retaining lug and the second retaining lug, respectively, being bent to the outside; and
an annular spring steel sheet which comprises one or more spring steel sheet parts arranged between the bearing plate and the inner wall,
wherein the first retaining lug and the second retaining lug of each one of the one or more bearing plate parts engage in the at least one first groove or in the at least one second groove, respectively.

2. A radial air bearing device according to claim 1,
wherein each one of the one or more spring steel sheet parts has a radially inward side and two circumferential ends running in an axial direction and facing one another, wherein a first retaining lug is provided on one of the two circumferential ends and wherein a second retaining lug is provided on the other one of the two circumferential ends, with each of the first retaining lug and the second retaining lug, respectively, being bent to the outside via a bending edge extending substantially longitudinally or substantially transversely to an axial direction of the recess so that the first retaining lug and the second retaining lug engage in the at least one first groove or in the at least one second groove, respectively.

3. A radial air bearing device according to claim 2,
wherein the first and the second retaining lugs are formed from plate portions that are one piece with the bearing plate part and/or the spring steel sheet part.

4. A radial air bearing device according to claim 3,
wherein the bearing plate part or the spring steel sheet part has a rectangular basic form with slots which define the plate portions, or
wherein the bearing plate part or the spring steel sheet part has a rectangular basic form with plate portions, which protrude beyond the basic form, for the retaining lugs.

5. A radial air bearing device according to claim 2,
wherein the first retaining lugs and the second retaining lugs run parallel to a longitudinal side of the bearing plate part or the spring steel sheet part, and their bending edges are spaced apart from the longitudinal side of the bearing plate part or the spring steel sheet part.

6. A radial air bearing device according to claim 2,
wherein the bearing plate comprises tongues formed by recesses in the bearing plate and/or wherein the spring steel sheet comprises tongues formed by recesses in the spring steel sheet.

7. A radial air bearing device according to claim 6,
wherein the recesses are formed to be U-shaped or H-shaped.

8. A radial air bearing device according to claim 7,
wherein the bearing plate in an idle position is prestressed in such a manner that the tongues protrude inwards in regions relative to the face sides.

9. A radial air bearing device according to claim 6,
wherein the first retaining lugs and the second retaining lugs run parallel to a longitudinal side of the bearing plate part or the spring steel sheet part, and
wherein the bearing plate in an idle position is prestressed in such a manner that the tongues protrude inwards in regions relative to the longitudinal sides.

10. A radial air bearing device according to claim 6,
wherein positions of the tongues in the spring steel sheet correspond to positions of the tongues in the bearing plate.

11. A radial air bearing device according to claim 2,
wherein the first and second retaining lugs are, in each case, bent to the outside via a bending edge extending substantially longitudinally to an axial direction of the recess, or are bent to the outside via a bending edge extending substantially transversely to the axial direction.

12. A radial air bearing device according to claim 11,
wherein in the case of the bearing plate which comprises only one bearing plate part or in the case of the spring steel sheet which comprises only one spring steel sheet part, the circumferential ends thereof face one another.

13. A radial air bearing device according to claim 11,
wherein in the case of the bearing plate with multiple bearing plate parts, one of the circumferential ends of adjacent bearing plate parts face one another.

14. A radial air bearing device according to claim 11,
wherein in the case of the spring steel sheet with multiple spring steel sheet parts, the circumferential ends of adjacent spring steel sheet parts face one another.

15. A radial air bearing device according to claim 1,
wherein the first and second retaining lugs are, in each case, bent to the outside via a bending edge substantially longitudinally to an axial direction of the recess, or are bent to the outside via a bending edge substantially transversely to the axial direction.

16. A radial air bearing device according to claim 1,
wherein in the case of the bearing plate which comprises only one bearing plate part or in the case of the spring steel sheet which comprises only one spring steel sheet part, the circumferential ends of the one bearing plate part or the one spring steel sheet part face one another.

17. A radial air bearing device according to claim 1,
wherein the spring steel sheet part comprises clips, and wherein the bearing plate part comprises slots on the circumferential ends in which the clips engage.

18. A radial air bearing device according to claim 1,
wherein an inner main side of the bearing plate part is coated.

19. A radial air bearing device according to claim 1,
wherein in the case of the bearing plate with multiple bearing plates or in the case of the spring steel sheet with multiple spring steel sheet parts, in each case one of the circumferential ends of adjacent bearing plate parts or adjacent spring steel sheet parts face one another.

20. A method for producing a radial air bearing device according to claim 1, the method comprising:
providing a spring steel sheet blank and imprinting a wave form into the spring steel sheet blank for the formation of the spring steel sheet part;
providing a bearing plate blank with plate regions for the respective first and second retaining lugs and bending the plate regions for the formation of the bearing plate part; and
inserting the spring steel sheet part and the bearing plate part into the recess of the bearing receptacle so that the first retaining lug of the bearing plate part engages in the first groove and so that the second retaining lug of the bearing plate part engages in the second groove.

* * * * *